United States Patent
Saravanakumar

(10) Patent No.: US 8,024,605 B2
(45) Date of Patent: Sep. 20, 2011

(54) TO SERVER PROCESSES

(75) Inventor: Ramasubramanian Saravanakumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1071 days.

(21) Appl. No.: 11/207,727

(22) Filed: Aug. 22, 2005

(65) Prior Publication Data
US 2006/0167893 A1 Jul. 27, 2006

(30) Foreign Application Priority Data
Jan. 24, 2005 (IN) .................................. 30/KOL/05

(51) Int. Cl.
*G06F 11/00* (2006.01)
(52) U.S. Cl. .......... 714/13; 709/203; 714/4.1; 714/4.11; 714/10; 714/11
(58) Field of Classification Search .................. 709/203; 714/39, 4.1, 4.11, 4.12, 10–13
See application file for complete search history.

(56) References Cited

U.S. PATENT DOCUMENTS

| | | | | |
|---|---|---|---|---|
| 5,185,693 A * | 2/1993 | Loftis et al. | ...................... | 700/82 |
| 5,541,987 A * | 7/1996 | Topper et al. | .................. | 379/230 |
| 5,548,535 A * | 8/1996 | Zvonar | ........................... | 702/81 |
| 5,673,253 A * | 9/1997 | Shaffer | ........................ | 370/229 |
| 6,108,655 A * | 8/2000 | Schleimer et al. | .............. | 707/10 |
| 6,125,401 A * | 9/2000 | Huras et al. | ................... | 719/310 |
| 6,134,673 A * | 10/2000 | Chrabaszcz | ..................... | 714/13 |
| 6,223,202 B1 * | 4/2001 | Bayeh | ........................... | 718/102 |
| 6,944,788 B2 * | 9/2005 | Dinker et al. | ..................... | 714/4 |
| 7,076,691 B1 * | 7/2006 | Dobberpuhl et al. | ........... | 714/13 |
| 2002/0087912 A1 * | 7/2002 | Kashyap | ......................... | 714/13 |
| 2002/0143874 A1 * | 10/2002 | Marquette et al. | ............. | 709/204 |
| 2004/0210898 A1 * | 10/2004 | Bergen et al. | .................. | 718/100 |
| 2004/0225911 A1 * | 11/2004 | Smith | ............................... | 714/4 |
| 2004/0236989 A1 * | 11/2004 | Pavlik et al. | ..................... | 714/15 |
| 2005/0160133 A1 * | 7/2005 | Greenlee et al. | .............. | 709/200 |
| 2006/0026443 A1 * | 2/2006 | McMahan et al. | ............ | 713/193 |
| 2006/0164977 A1 * | 7/2006 | Kienzle | ......................... | 370/229 |

OTHER PUBLICATIONS

Comer, Doug. "Q & A on TCP FIN-Wait-2 and Close-Wait states" [online], Jun. 24, 2001 [Retrieved on Mar. 30, 2009], Purdue University [Retrieved from: http://web.archive.org/web/20010624164322/ http://www.netbook.cs.purdue.edu/othrpags/qanda148.htm].*

* cited by examiner

*Primary Examiner* — Philip J Chea
*Assistant Examiner* — Eric W Shepperd
(74) *Attorney, Agent, or Firm* — Murphy & King, P.C.

(57) ABSTRACT

A method for maintaining the ability of a parent server process to communicate with one or more client processes is disclosed. In the method, a first child server process is configured to monitor for failure of the parent server process and to respond to failure of the parent server process by:
i) continuing any communication with the client processes that would have been performed by the parent server process had it not failed; and
ii) initiating a second child server process which is configured to monitor for failure of the first child server process and to respond to such a failure in the same manner as the first child server process responds to failure of the parent server process.

12 Claims, 5 Drawing Sheets

TO SERVER PROCESSES

BACKGROUND OF THE INVENTION

1. Field of the Invention

This invention relates to improvements in server processes, and specifically to a method for maintaining the ability of a parent server process to communicate with one or more client processes.

2. Description of the Related Art

The reliability of a server process in a client server computer system is critical. The server must ensure that each client request is serviced reliably with very little and preferably no loss of data. Server processes are usually monitored by a separate monitor process. Such monitor processes can detect when the associated server process has failed, for example by crashing. In response to this, the monitor will initiate a replacement server process to resume the functions previously performed by the failed server process.

This approach has the inherent disadvantage that each client has to detect the failure of the server process through its network connection and reconnect to the replacement server process.

SUMMARY OF THE INVENTION

In accordance with one aspect of the present invention, there is provided a method for maintaining the ability of a parent server process to communicate with one or more client processes, wherein a first child server process is configured to monitor for failure of the parent server process and to respond to failure of the parent server process by:

continuing any communication with the client processes that would have been performed by the parent server process 30 had it not failed; and initiating a second child server process which is configured to monitor for failure of the first child server process and to respond to such a failure in the same manner as the first child server process responds to failure of the parent server process.

In accordance with a second aspect of the present invention, there is provided a system comprising a processor adapted to execute a parent server process capable of communicating with one or more client processes, wherein the processor is further adapted to execute a first child server process which is configured to monitor for failure of the parent server process, and to respond to failure of the parent server process by:

i) continuing any communication with the client processes that would have been performed by the parent server process had it not failed; and ii) initiating a second child server process which is configured to monitor for failure of the first child server process and to respond to such a failure in the same manner as the first child server process responds to failure of the parent server process.

Hence, the invention overcomes the above-mentioned problems of the prior art since in the event of the failure of the parent server process, all connections between clients and the parent server process are taken over transparently by the first child server process. Thus, there is no need for the client processes to reconnect. Indeed, they would be unaware that the failure of the parent server process has occurred since the first child server process takes over on the event of failure of the parent server process and initiates its own child server process before proceeding with handling the network connections.

In one embodiment, the first child server process is configured to monitor for failure of the parent server process by establishing a communication link with the parent server process and detecting termination of the link as a result of failure of the parent server process. Normally this communication link is a transport connection.

The termination of the link may be detected by the first child server process monitoring for receipt of an end-of-file marker over the link.

A further disadvantage with the prior art is that the monitor process is a single point of failure. Thus, if the monitor process fails itself then no action would be taken in the event that a server process subsequently fails.

In order to overcome this problem, the parent server process is preferably configured to respond to a child server process replacement event by terminating the first child server process and initiating a replacement child server process configured in the same manner as the first child server process.

The child server replacement event may occur when a predetermined time has elapsed, or alternatively it may occur when a predetermined number of client processes have established communication with the parent server process.

Data that are used by the parent and child server processes may be stored in a shared memory. In this case, the system may further comprise a shared memory for storage of data by the parent and first child server processes.

The server processes may be any type of process, but typically they would be one of a hyper-text transfer protocol (HTTP) web server process, a simple mail transfer protocol (SMTP) server process, a file transfer protocol (FTP) server process and a TELNET server process.

In accordance with a third aspect of the present invention, there is provided a computer program comprising computer program code means adapted to perform the method of the first aspect of the invention when said program is run on a computer.

In accordance with a fourth aspect of the present invention, there is provided a computer program product comprising computer program code means adapted to perform the method of the first aspect of the invention when said program is run on a computer.

BRIEF DESCRIPTION OF THE DRAWINGS

An embodiment of the invention will now be described with reference to the accompanying drawings, in which.

DETAILED DESCRIPTION OF THE PREFERRED EMBODIMENTS

Figure 1:
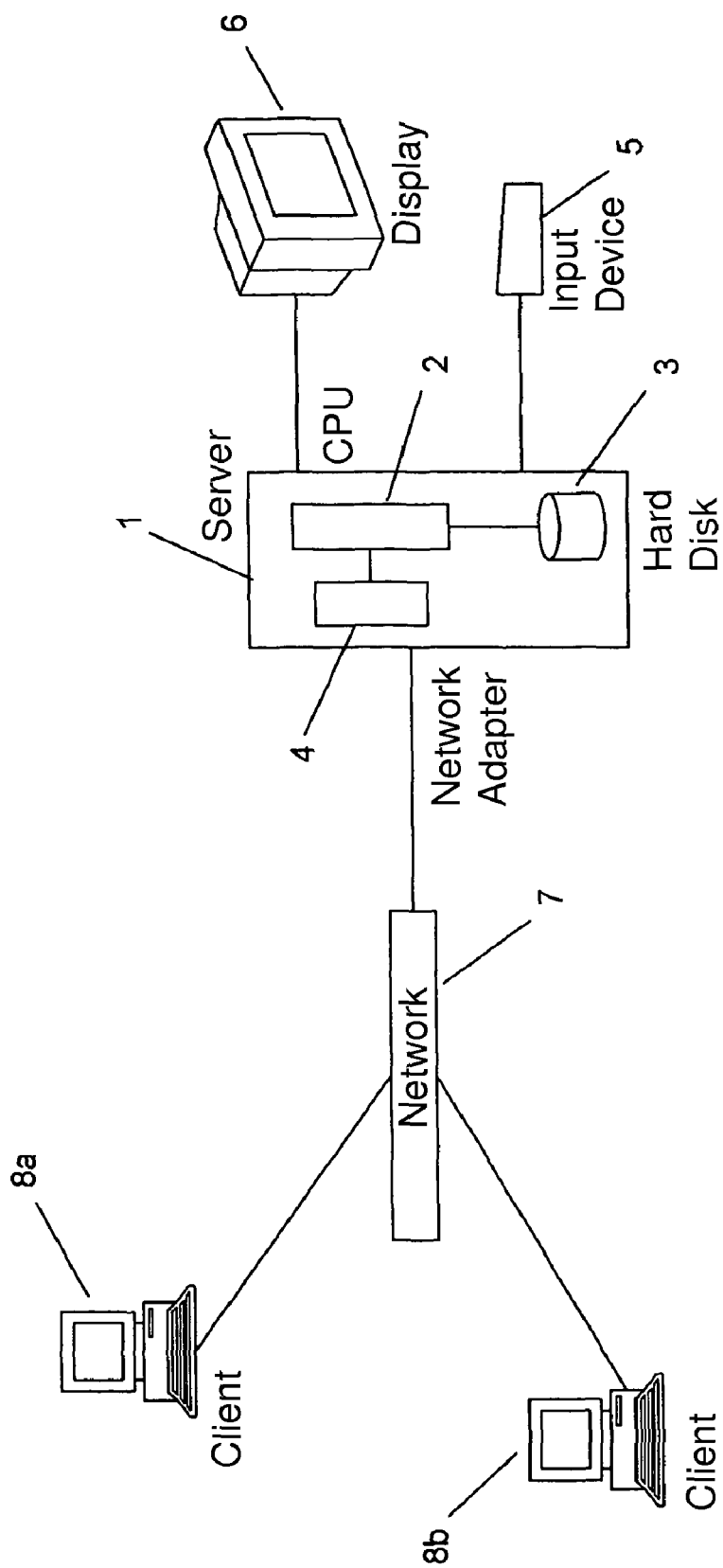
FIG. 1 shows a schematic representation of a client-server computer system on which the invention may be implemented.

FIG. 1 shows a client-server computer system suitable for implementing the invention. A server 1 has a central processing unit (CPU) connected to a hard disk 3 and a network adaptor 4. The server 1 receives information from the user via input device 5 which may be, for example, a mouse or a keyboard. Output from the server 1 is displayed on display 6. The network adaptor 4 provides the capability for the server 1 to communicate with clients 8a and 8b via a network 7. The network 7 may be any type of conventional network, and it may be a public network, such as the Internet.

Figure 2:
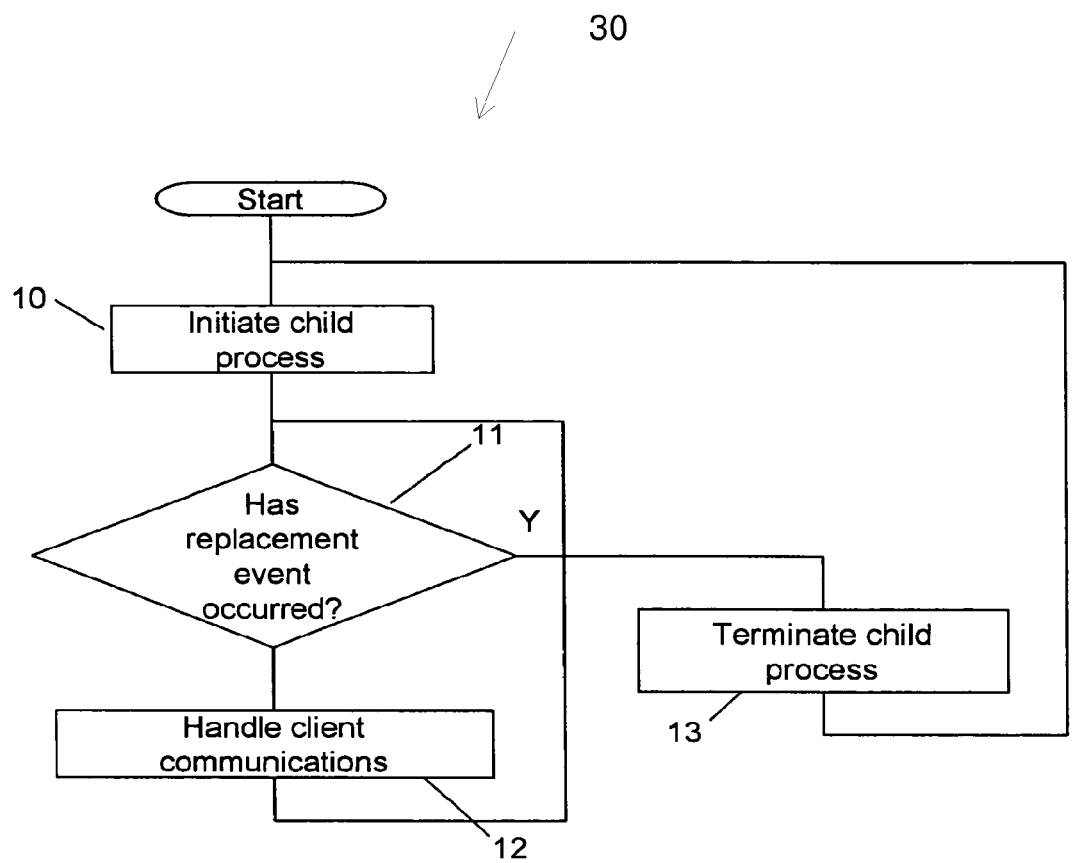
FIG. 2 shows a flow diagram for the parent server process.

The CPU 2 is adapted to execute a parent server process, a flow diagram for which is shown in FIG. 2. The parent server process may be stored on hard disk 3 and may be any of a variety of server processes, but typically it will be a web server process or FTP server process or another type of well known server process.

As can be seen in FIG. 2, the first action taken by the parent server process in step 10 is to initiate a child process which will be described later with reference to FIG. 3. It is to be noted that the terms "child process" and "child server process" are used interchangeably throughout this document and refer to the same feature. The parent server process then proceeds to execute the loop comprising decision stage 11 and processing step 12.

In decision stage 11, the parent server process monitors for the occurrence of a replacement event (which will be described later). If such an event has occurred then processing is diverted from the loop to step 13 which terminates the child process. Processing then proceeds to step 10 where a new child process is initiated before the main processing loop comprising decision step 11 and step 12 is reentered.

If a replacement event has not occurred then the parent server process will proceed to handle communications with any client, for example clients 8a, 8b, in step 12.

Figure 3:
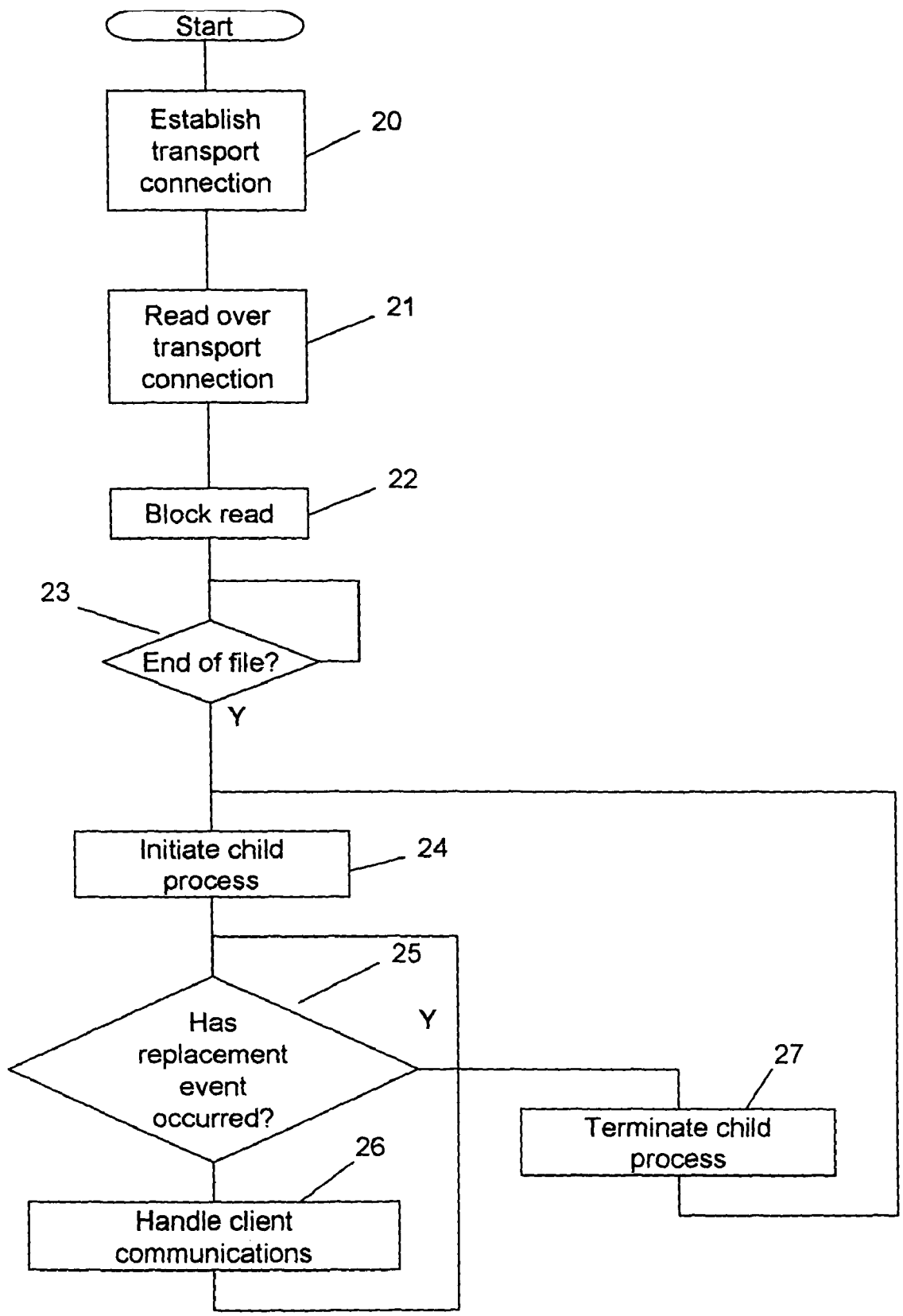
FIG. 3 shows a corresponding flow diagram for the child server process.

FIG. 3 shows a flow diagram for the child server process. Immediately after it has been initiated, the child server process establishes a transport connection in processing step 20.

As will be appreciated by the skilled man, a transport connection is a type of network connection established between a client and server at the transport layer of the network stack. A Transmission Control Protocol (TCP) connection is an example of a transport connection.

This transport connection enables communications between the child server process and the parent server process. The child server process then proceeds in step 21 to perform a read operation over the transport connection. By default, when a read operation is performed and there is no data to be read, then the process is said to be blocking on a read. The process is put into a sleep mode (i.e. consumes no CPU cycles) until sufficient data is available to be read. Since there is no data to read, the read operation is blocked in step 22 so that no CPU cycles are used in actually carrying out the read. It is beneficial that no CPU cycles are consumed by the read operation since the establishment of the transport connection and subsequent reading of data is only performed for the purposes of monitoring for failure of the parent server process.

This monitoring is performed in decision step 23 which monitors for receipt of an end-of-file marker over the transport connection. This will occur if the parent server process fails, thereby dropping the transport connection. If no end-of-file marker is detected in decision step 23 then the child server process simply remains blocked waiting for the receipt of this marker.

If, however, an end-of-file marker is received, indicating that the parent server process has failed, then processing proceeds to step 24 in which the child server process effectively takes over the functionality of the now-failed parent server process and initiates its own child process. Processing then proceeds in steps 24, 25, 26 and 27 which are analogous to steps 10, 11, 12 and 13 carried out by the parent server process and shown in FIG. 2. The newly-started child process continues the function of the previous child process by establishing a transport connection with the previous child process and monitoring for failure of the previous child process in the same manner as already described.

When a parent process initiates a child process, all the socket descriptors (through which communication between server and client processes is performed) and file descriptors are duplicated in the child process. Thus, if the parent process fails, the connections to the client processes are not closed since they can be taken over by the child process.

Since the connections with clients 8a, 8b over the network 7, are shared across parent and child processes, the new parent process will continue to handle the existing client connections, without the clients being aware that a failure has occurred and without having to reconnect to the server 1.

It may be necessary for the parent child process to share data, for example, the data that the parent process needs to provide for the child process to take over in the event of the parent process failing. Any such data may be stored in a shared memory (not shown) in CPU 2 or on hard disk 3. Indeed, any other suitable Inter Process Communication (IPC) mechanism, such as a pipe or message queue, may be used.

Figure 4:
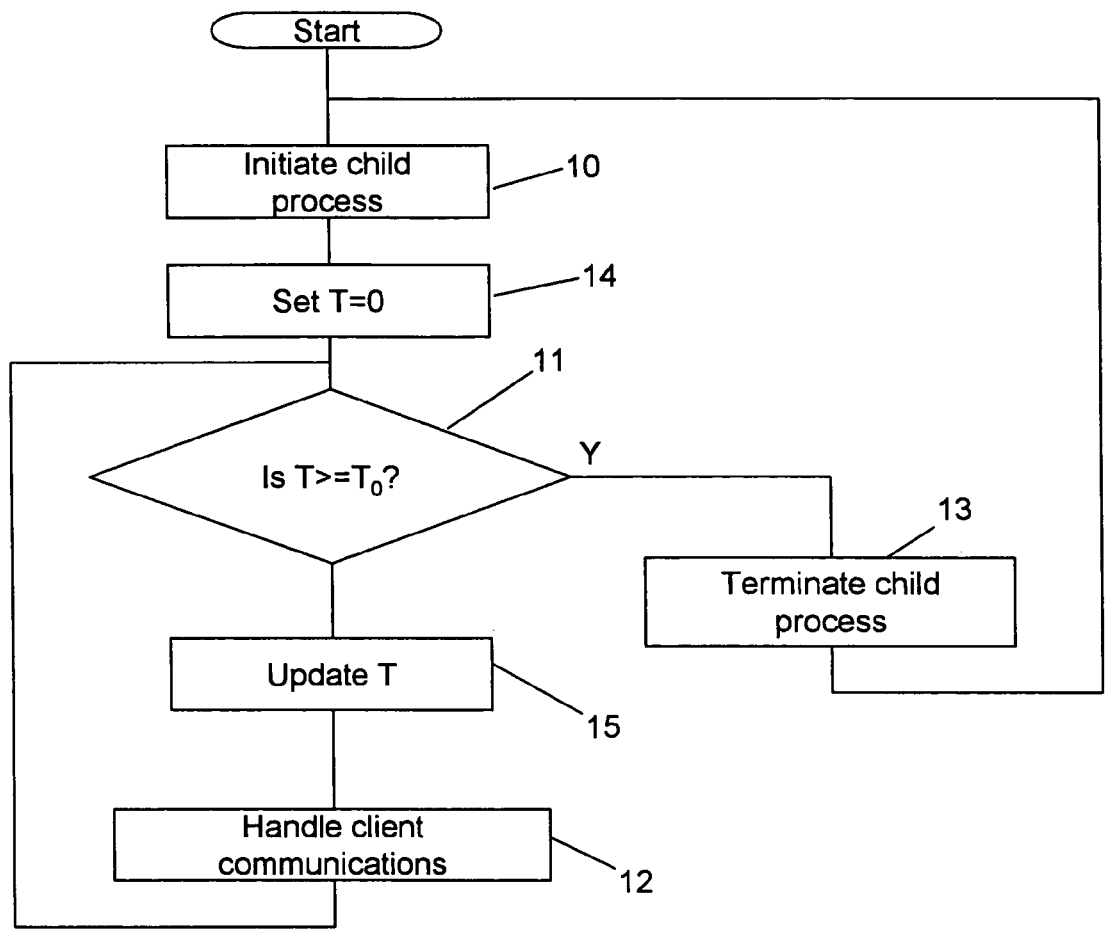
FIG. 4 shows a flow diagram for the parent server process in the event that child server processes are terminated and replaced after a certain time period has elapsed.
Figure 5:
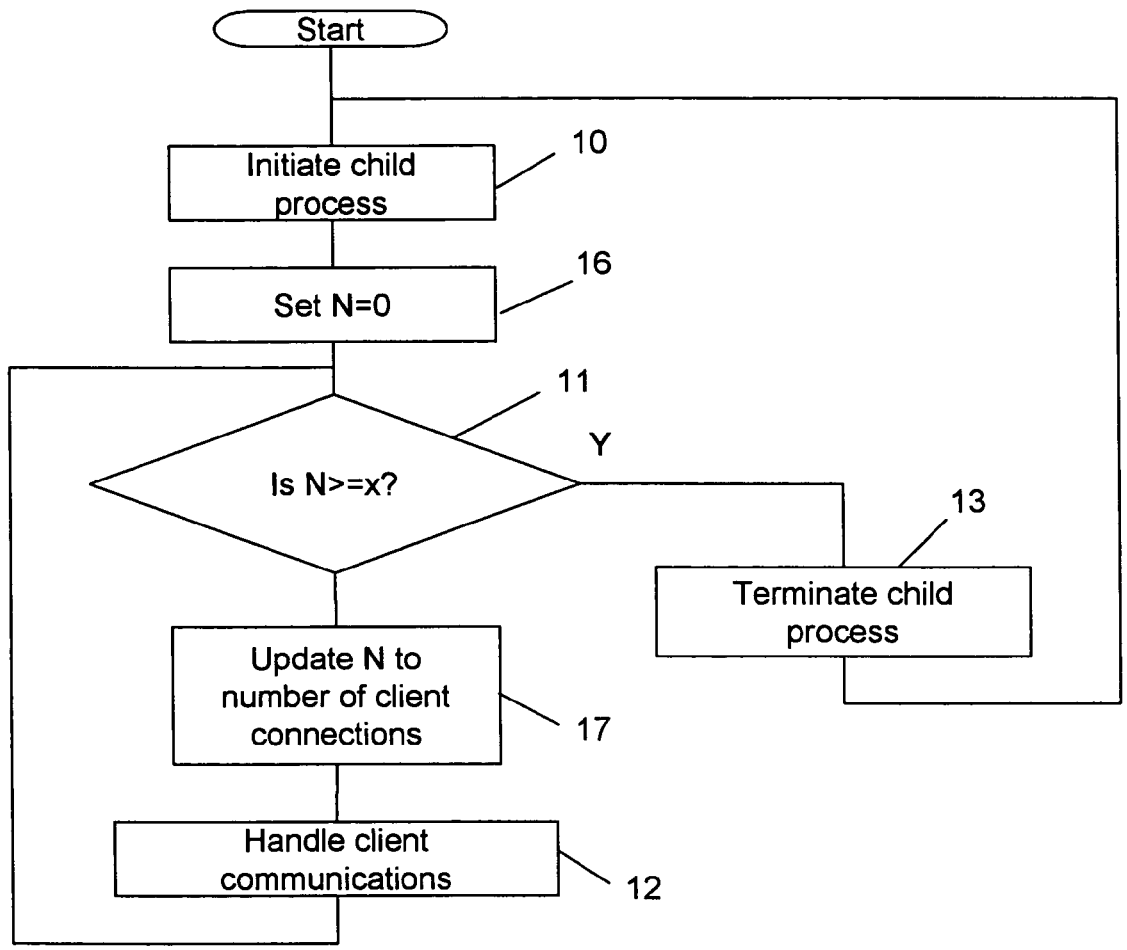
FIG. 5 shows a flow diagram for the parent server 10 process in the event that child processes are terminated and replaced based on connection load.

As has already been explained, the parent server process will, on occurrence of a replacement event, terminate its child process in step 13 and initiate a new child process in step 10. This is done for two reasons. Firstly, it may be that, between the time of creating the child server process and the present, new client connections have been established with the parent server process. The child server process cannot use these connections as they were made after its initiation. By replacing the child server process periodically (ideally, every time a new connection is made) the new connections are duplicated in the child process. Secondly, this allows the parent process to deal with any child process that may have failed. If such is the case and the parent server process subsequently fails there would be no mechanism for ensuring the continuity of server availability. However, by periodically restarting the child process, there is some level of reliability built into the methods. FIGS. 4 and 5 show two methods which are envisaged for causing the occurrence of a replacement event.

In FIG. 4, the replacement event is time based. As can be seen after the child process is initiated in step 10, a timer is initiated with a value of 0 in step 14. Decision step 11 now monitors the value of T. If it is greater than or equal to a desired value, To, then the child process is terminated in step 13 before processing proceeds back to step 10, where a replacement child process is initiated. If the value of T is less than To, then it is updated in step 15 before client communications are dealt with in step 12 and processing proceeds around the loop comprising decision step 11, step 15 and step 12. In this way, the child process is terminated and restarted at a periodic interval of To seconds. Clearly, other timer methods may be used, for example causing a hardware timer to generate an interrupt periodically and configuring the interrupt service routine to terminate the existing child server process and initiate a replacement.

FIG. 5 shows an alternative method which is based on connection load. In this, after the child process has been initiated in step 10 a counter N is set to an initial value of 0 in step 16. Decision step 11 now monitors the value of N. If it is greater than or equal to a value of x then the child process is terminated in step 13 and processing proceeds back to step 10 where a new child process is initiated. However, if N is less than x then processing proceeds to step 17 where the value of N, that is the number of network connections to clients, is updated to be the number of client connections. Client communications are then dealt with in step 12 before processing proceeds back to decision step 11. In this way a new child process is started every time the number of client connections increases by the value of x, which may be anything from one connection upwards. Typically, x will be an heuristically derived value.

As can be seen from the description of this embodiment, a highly reliable process is made available by this invention in which clients do not need to reconnect to a server should it fail. There is no single point of failure since the child process will take over the functionality of the parent process and initiate its own child process should the parent server process fail. Furthermore, the method is still very efficient since the child process blocks the read over the transport connection thereby preventing the wasting of CPU cycles.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

I claim:

1. A computer implemented method for maintaining the ability of a server to communicate with one or more client processes, comprising:
    handling, by a parent server process, client communications to the one or more client processes;
    initiating, by the parent server process, a first child server process;
    monitoring, by the first child server process, for failure of the parent server process, wherein the monitoring comprises:
        establishing, by the first child server process, a communications link with the parent server process;
        performing, by the first child server process, a read operation over the communications link; and
        placing, when the read operation is performed and there is no data available to read, the first child server process into a sleep mode until there is data available to read, wherein when in sleep mode read operations are blocked;
    detecting, by the first child server process, the termination of the communications link between the parent server process and the first child server process; and
    responding, by the first child server process, to the failure of the parent server process by:
        continuing the handling of existing client communications to the one or more client processes handled by the parent server process prior to the failure of the parent server process; and
        initiating a second child server process which is initiated to perform, for the first client server process, monitoring and responding as performed by the first client server process prior to the failure of the parent server process.

2. A method according to claim 1, wherein the termination of the communications link is a result of failure of the parent server process.

3. A method according to claim 2, wherein the communications link is a transport connection.

4. A method according to claim 2, wherein the termination of the communications link is detected by the first child server process monitoring for receipt of an end-of-file marker over the communications link.

5. A method according to claim 1, wherein the parent server process responds to a child server process replacement event by terminating the first child server process and initiating a replacement child server process in the same manner as the first child server process.

6. A method according to claim 5, wherein the child server process replacement event occurs when a predetermined time has elapsed.

7. A method according to claim 5, wherein the child server process replacement event occurs when a predetermined number of client processes have established communication with the parent server process.

8. A method according to claim 1, wherein data are stored by the parent server process and the first and second child server processes in a shared memory.

9. A method according to claim 1, wherein the parent server process and first and second client server processes are one of a Hypertext transfer protocol (HTTP) web server process, a Simple Mail Transfer Protocol (SMTP) server process, a File Transfer Protocol (FTP) server process and a TELNET server process.

10. A system, comprising a processor executing a parent server process communicating with one or more client processes, the system configured to perform the steps of:
    handling, by the parent server process, client communications to the one or more client processes;
    initiating, by the parent server process, a first child server process;
    monitoring, by the first child server process, for failure of the parent server process, wherein the monitoring comprises:
        establishing, by the first child server process, a communications link with the parent server process;
        performing, by the first child server process, a read operation over the communications link; and
        placing, when the read operation is performed and there is no data available to read, the first child server process into a sleep mode until there is data available to read, wherein when in sleep mode read operations are blocked;
    detecting, by the first child server process, the termination of the communications link between the parent server process and the first child server process; and
    responding, by the first child server process, to the failure of the parent server process by:
    continuing; and
    initiating a second child server process which is initiated to perform, for the first client server process, monitoring and responding as performed by the first client server process prior to the failure of the parent server process.

11. A system according to claim 10 further comprising a shared memory for storage of data by the parent server process and the first and second child server processes.

12. A computer program product for maintaining the ability of a server to communicate with one or more client processes, the computer program product comprising a non-transitory computer readable storage medium and computer program instructions, recorded on the computer readable medium, executable by a processor, for performing the steps of:
    handling, by a parent server process, client communications to the one or more client processes;

initiating, by the parent server process, a first child server process;

monitoring, by the first child server process, for failure of the parent server process, wherein the monitoring comprises:

establishing, by the first child server process, a communications link with the parent server process;

performing, by the first child server process, a read operation over the communications link; and placing, when the read operation is performed and there is no data available to read, the first child server process into a sleep mode until there is data available to read, wherein when in sleep mode read operations are blocked;

detecting, by the first child server process, the termination of the communications link between the parent server process and the first child server process; and responding, by the first child server process, to a failure of the parent server process by:

continuing the handling of existing client communications to the one or more client processes handled by the parent server process prior to the failure of the parent server process; and initiating a second child server process which is initiated to perform, for the first client server process, monitoring and responding as performed by the first client server process prior to the failure of the parent server process.

* * * * *

UNITED STATES PATENT AND TRADEMARK OFFICE
CERTIFICATE OF CORRECTION

| | | |
|---|---|---|
| PATENT NO. | : 8,024,605 B2 | Page 1 of 1 |
| APPLICATION NO. | : 11/207727 | |
| DATED | : September 20, 2011 | |
| INVENTOR(S) | : Saravanakumar | |

It is certified that error appears in the above-identified patent and that said Letters Patent is hereby corrected as shown below:

In column 4, line 47, delete "To," and insert -- $T_0$, --, therefor.

In column 4, line 50, delete "To," and insert -- $T_0$, --, therefor.

In column 4, line 54, delete "To" and insert -- $T_0$ --, therefor.

In column 5, line 60, in Claim 1, delete "client" and insert -- child --, therefor.

In column 5, line 61, in Claim 1, delete "client" and insert -- child --, therefor.

In column 6, line 18, in Claim 8, delete "are" and insert -- is --, therefor.

In column 6, line 22, in Claim 9, delete "client" and insert -- child --, therefor.

In column 6, line 51, in Claim 10, delete "continuing;" and insert -- continuing the handling of existing client communications to the one or more client processes handled by the parent server process prior to the failure of the parent server process; --, therefor.

In column 6, line 53, in Claim 10, delete "client" and insert -- child --, therefor.

In column 6, line 54, in Claim 10, delete "client" and insert -- child --, therefor.

In column 8, line 11, in Claim 12, delete "client" and insert -- child --, therefor.

In column 8, line 12, in Claim 12, delete "client" and insert -- child --, therefor.

Signed and Sealed this
Thirteenth Day of December, 2011

David J. Kappos
*Director of the United States Patent and Trademark Office*